United States Patent [19]

Omlin et al.

[11] Patent Number: 5,706,400
[45] Date of Patent: Jan. 6, 1998

[54] FAULT-TOLERANT IMPLEMENTATION OF FINITE-STATE AUTOMATA IN RECURRENT NEURAL NETWORKS

[75] Inventors: Christian Walter Peter Omlin, Albany, N.Y.; C. Lee Giles, Lawrenceville, N.J.

[73] Assignee: NEC Research Institute, Inc., Princeton, N.J.

[21] Appl. No.: 400,732

[22] Filed: Mar. 8, 1995

[51] Int. Cl.$^6$ .................................................. G06F 15/00
[52] U.S. Cl. ................................................ 395/21; 395/24
[58] Field of Search ................................ 395/27, 22, 24, 395/21, 23

[56] References Cited

U.S. PATENT DOCUMENTS 5,155,801  10/1992  Lincoln ................................. 395/22

OTHER PUBLICATIONS

Omlin and Giles, "Constructing Deterministic Finite-State Automata in Sparse Recurrent Neural Netowrks," IEEE International Conference on Neural Networks (ICNN '94), 1994, pp. 1732–1737.

May, "Fault simulation of a wafer-scale neural network," Oregon Graduate Center, Feb. 1988.

Wulff and Hertz, (1992) "Prediction with Recurrent Networks", Neural Networks for Signal Processing, Proceedings of the IEEE-SP Workshop, p. 464, Dec. 1992.

Phatak and Koren (1992). "Fault Tolerance of Feedforward Neural Nets for Classification," IEEE Neural Networks, 1992 International Conference, vol. 2., p. 386, Dec. 1992.

Giles and Miller (1992) "Learning and Extracting Finite State Automata with Second-Order Recurrent Neural Networks," Neural Computation, vol. 4, p. 393, Dec. 1992.

Sun et al. "Turning Equivalence of Neural Networks with Second Order Connection Weights," IEEE Neural Networks 1991 International Conference, vol. 2, p. 357, Dec. 1991.

Primary Examiner—Tariq R. Hafiz
Assistant Examiner—Ji-Yong D. Chung
Attorney, Agent, or Firm—Philip J. Feig

[57] ABSTRACT

Any deterministic finite-state automata (DFA) can be implemented in a sparse recurrent neural network (RNN) with second-order weights and sigmoidal discriminant functions. Construction algorithms can be extended to fault-tolerant DFA implementations such that faults in an analog implementation of neurons or weights do not affect the desired network performance. The weights are replicated k times for k-1 fault tolerance. Alternatively, the independent network is replicated 2k+1 times and the majority of the outputs is used for a k fault tolerance. In a further alternative solution, a single network with kn neurons uses a "n choose k"-encoding algorithm for k fault tolerance.

7 Claims, 4 Drawing Sheets

FIG. 3

AOGORITHM INITIALIZATION:

1. choose N>M neurons with sigmoidal discriminant function $(x) = \frac{1}{1+e^{-n}}$ 2. for each $a_k \in \Sigma$ construct an input vector $(0, ..., 0, I_{k-1}, 1, I_{k+1}, 0, ...0)$ of length K 3. choose weight strength H such that $$\phi^-_\Delta (H) \leq \frac{1}{2n}(1+\frac{1}{H}) \text{ with } \phi^+_\Delta (H) > \frac{1}{4}(3+\frac{1}{H})$$

where $\phi^-_\Delta(H)$ and $\phi^+_\Delta(H)$ are the fixed points of the discriminant function $h_\Delta(x, H)$

NETWORK CONSTRUCTION:

4. for i=1...N
   $b_i = -H/2$;
   for j=1...N
      for k=1...K
         $W_{ijk} = +H$ if $\delta(q_j, a_k) = q_i$; $W_{ijk} = -H$ if $\delta(q_j, a_k) \neq q_i$;
         $W_{0jk} = +H$ if $\delta(q_j, a_k) \in F$; $W_{0jk} = -H$ if $\delta(q_j, a_k) \notin F$;

NETWORK INITIALIZATION:

5. Before reading a new string, set the initial network state to $$S^0 = (S^0_0, S^0_1, ..., S^0_N) = (S^0_0, 1, 0, ..., 0)$$

with $S^0_0 = 1$ if $q_1 \in F$ and $S^0_0 = 0$ otherwise;

NETWORK DYNAMICS:

6. $S^{t+1}_i = g(b_i + \sum_{j,k} W_{ijk} S^t_j I^t_k)$

NETWORK PERFORMANCE:

7. The output of $S^f_0$ after reading a string s of length f is 1 if $s \in L(DFA)$ and 0 otherwise

NETWORK COMPLEXITY:

8. number of neurons: M+1; number of weights: O(MN); maximum fan-out: 3M weight alphabet $\Sigma w = \{-H, -H/2, 0, H\}$

FIG. 4

INPUT: DFA $(\Sigma, Q, q_1, F, \delta)$ with $\Sigma = \{a_1, a_2, ..., a_K\}$, $Q = \{q_1, q_2, ...q_M\}$, $q_1$ is the start state, $F \subseteq Q$ is the set of accepting states, $\delta: \Sigma \times Q \rightarrow Q$ are the state transitions.

OUTPUT: SORNN with L(SORNN) = L(DFA) which is unique up to labeling of neurons which tolerates up to $(P-1)(N+1)$ neuron-stuck-at-zero faults and up to $(P^2-1)(N+1)$ wieght-stuck-at-zero faults ALGORITHM INITIALIZATION:
1. choose $N = PM + 1$ $(P > 1)$ neurons with sigmoidal discriminant function $(x) = \frac{1}{1+e^{-x}}$
2. for each $a_k \in \Sigma$ construct an input vector $(0, ..., 0, I_{k-1}, 1, I_{k+1}, 0, ..., 0)$ of length K
3. choose weight strength H such that $$\phi_\Delta^-(H) < \frac{1}{2n}\left(1+\frac{1}{H}\right) \text{ with } \phi_\Delta^+(H) > \frac{1}{4}\left(3+\frac{1}{H}\right)$$

where $\phi_\Delta^-(H)$ and $\phi_\Delta^+(H)$ are the fixed points of the discriminant function $h_\Delta(x, H)$

NETWORK CONSTRUCTION:

4. for $i = 1...N$
    $b_i = -H/2$;
    for $j = 1...N$
        for $k = 1...K$
            for $p = 1...P$
                $W_{ijk}^p = +H$ if $\delta(q_j, a_k) = q_i$; $W_{ijk}^p = -H$ if $\delta(q_j, a_k) \neq q_i$;
                $W_{0jk}^p = +H$ if $\delta(q_j, a_k) \in F$; $W_{0jk}^p = -H$ if $\delta(q_j, a_k) \notin F$;

NETWORK INITIALIZATION:

5. Before reading a new string, set the initial network state to
$$S^0 = (S_0^0, S_{1,1}^0, ..., S_{1,p}^0, ..., S_{N,1}^0, ..., S_{N,P}^0) = (S_0^0, 1, ..., 1, 0, ..., 0)$$
with $S_0^0 = 1$ if $q_1 \in F$ and $S_0^0 = 0$ otherwise;

NETWORK DYNAMICS:
6. $S_{i,p}^{t+1} = g(b_i + \sum_{j,p,k} W_{ijk}^p S_{j,p}^t I_k^t)$

NETWORK PERFORMANCE:

7. The output of $S_0^f$ after reading a string s of length f is 1
if $s \in L(DFA)$ and 0 otherwise

NETWORK COMPLEXITY:

8. number of neurons: $P(M+1)$; number of weights: $O(P^2 MN)$; maximum fan-out: $3PM$
weight alphabet $\Sigma_W = \{-H, -H/2, 0, H\}$

NEURON STATES: ◯ INACTIVE  ◉ ACTIVE

FAULT-TOLERANT IMPLEMENTATION OF FINITE-STATE AUTOMATA IN RECURRENT NEURAL NETWORKS

FIELD OF THE INVENTION

The present invention relates to deterministic finite-state automata (DFA) implemented in recurrent neural networks (RNN) with second-order weights such that the languages recognized by the DFA and the RNN are identical for arbitrary string lengths and specifically, the invention relates to design methods for achieving fault-tolerant designs of DFAs in sparse RNNs with second-order weights.

BACKGROUND OF THE INVENTION

Fault-tolerance is often mentioned as a desirable property of neural networks. However, neural networks are not inherently tolerant to faults in their internal structure; they can be made tolerant to certain types of faults either by providing multiple copies of the network resources or by training the network under conditions which emulate faults. Neural networks may be able to recover from faults in their internal structure through retraining.

In an article by C. Omlin and C. Giles entitled "Constructing Deterministic Finite-State Automata in Sparse Recurrent Neural Networks" in IEEE International Conference on Neural Networks (ICNN '94), 1994 it was shown that deterministic-finite state automata (DFAs) can be implemented in sparse recurrent neural networks (RNNs) with second-order weights such that the dynamics of the constructed network remains stable, i.e. the regular languages $L(M_{DFA})$ and $L(M_{RNN})$ recognized by the DFA M and the recurrent network RNN constructed from M are identical.

The present invention concerns RNN implementation of DFAs which can be made robust to certain faults in the RNN's internal structure.

Regular languages represent the smallest class of formal languages in the Chomsky hierarchy. Regular languages are generated by regular grammars. A regular grammar G is a quadruple G=<S, N, T, P> where S is the start symbol, N and T are non-terminal and terminal symbols, respectively. P are productions of the form A→α or A→αB where A, B ∈N and α∈T. The regular language generated by G is denoted L(G).

Associated with each regular language L is a deterministic finite-state automaton (DFA) M which is an acceptor for the language L(G), i.e. L(G)=L(M). DFA M accepts only strings which are a member of the regular language L(G). Formally, a DFA M is a 5-tuple M=<Σ, Q, $q_1$, F, δ> where Σ={$α_1, \ldots, α_m$} is the alphabet of the language L, Q={$q_1, \ldots, q_n$} is a set of states, $q_1 \in Q$ is the start state, F⊆Q is a set of accepting states and δ: Q×Σ→Q defines state transitions in M. A string z is accepted by the DFA M and hence is a member of the regular language L(M) if an accepting state is reached after the string χ has been read by M. Alternatively, a DFA M can also be considered a generator which generates the regular language L(M).

An artificial neural network comprises neurons which are processing elements. Each neuron receives input(s), processes the input(s) and provides an output. Associated with an input is a weight. The weight defines the relative importance of the input to a processing element. Learning is accomplished through the repeated adjustment of the weights of the network. The network learns by generating outputs. The generated outputs are compared with desired outputs. The weights are adjusted according to the error in the generated output and the process repeats.

Since neural networks have many processing nodes, each with primarily local connections, damage or faults to some of the nodes does not disable the entire network. The present invention concerns fault tolerant implementation of finite state automata in RNNs.

SUMMARY OF THE INVENTION

The present invention uses discrete-time, recurrent networks with second-order weights $W_{ijk}$ to implement DFAs. A network accepts a time-ordered sequence of inputs and evolves with dynamics defined by the following equations:

$$S_i^{(t+1)} = h(a_i(t)) = \frac{1}{1+e^{-a_i(t)}}, \quad a_i(t) = b_i + \sum_{j,k} W_{ijk} S_j^{(t)} I_k^{(t)}, \quad (1)$$

where $b_i$ is the bias associated with hidden recurrent state neurons $S_j$; $I_k$ denotes the input neuron for symbol $α_k$. The product $S_j^{(t)} I_k^{(t)}$ directly corresponds to the state transition δ($q_j$, $α_k$) =$q_i$. The encoding logarithm for sparse RNNs assumes that a unary encoding is used for the input symbols. A special heron $S_0$ represents the output (accept/reject) of a RNN. A network accepts a string if the value of $S_0$ at the end of the string is greater than 0.5; otherwise, the string is rejected.

It is shown in Omlin et. al that RNNs with sigmoidal discriminant functions can be constructed whose internal DFA state representation remains stable for strings of arbitrary length. The proof relies on a nearly orthonormal internal representation of DFA states; a network's weights and biases are programmed to values +H or −H and −H/2, respectively, in order to preserve the internal DFA representation. It follows that any DFA can be implemented in a RNN with second-order weights and sigmoidal discriminant functions. The invention applies only to second-order RNNs whose dynamics are governed by the equations (1).

The specific faults than can occur in a hardware implementation depend on whether a neural network is implemented in digital or analog technology. The results of a study on fault models in VLSI wafer neural networks can be found in a technical report by N. May and D. Hammerstein entitled "Fault simulation of a wafer-scale integrated neural network", Oregon Graduate Center, 1988. The present invention is only concerned with faults as they occur in analog implementations. Analog implementations of neural networks have the advantage of lower power consumption compared to digital implementations.

Deterministic finite-state automata (DFAs) can be implemented in recurrent neural networks with second-order weights such that the languages recognized by the DFA and the recurrent network are identical for arbitrary string length. The desired finite-state dynamics are achieved by programming a small subset of all weights $W_{ijk}$ uniformly to values +H or −H. This encoding achieves a nearly orthonormal internal representation of DFA states where only the recurrent neuron corresponding to the current DFA states has a high output (not including a possible high output for the network's output neuron). The number of weights in such a neural DFA grows linearly with the number of DFA states.

The invention concerns design methods for fault-tolerant designs of deterministic finite-state automata (DFAs) in sparse recurrent neural networks with second-order weights. The designs will be able to withstand the following faults: (1) the value of a fabricated weight may not be identical to the weight value of the design, i.e. $\overline{W}_{ijk}=W_{ijk} * (1\pm\epsilon_{ijk})$ if $W_{ijk} \neq 0$, where $\epsilon_{ijk}$ stands for the percentage of perturbation of some weight $W_{ijk}$, (2) the output of a neuron may be stuck at zero ('neuron stuck-at-zero') which effectively removes the neuron from the network, and (3) a 'weight-stuck-at-zero' effectively removes the faulty weight from the network.

Assuming that the weight perturbations can be bound by ε, conditions can be derived under which the desired finite-state dynamics remain stable. These conditions limit the maximum network size for stable low signals and the minimum value of H as a function of ε.

Tolerance to 'weight-stuck-a-zero' faults can be achieved by replicating all the second-order weights of a network whose strengths are +H. Such a design will tolerate exactly k−1 'weight-stuck-at-zero' faults per neuron if all the weights programmed to +H are replicated k times. Weights which have strength −H do not need to be replicated since the sigmoidal discriminant function of each neuron already provides a low output unless the neuron is driven to a high value by another neuron.

Tolerance to 'weight-stuck-at-zero' and 'neuron stuck-at-zero' faults can be provided in two different ways. A classification for a given string can be computed independently by separate networks. The output of the entire system is then computed based on a majority vote; if the majority of networks accept a given string, then that string is classified as accepted. The entire network must be replicated 2k+1 times in order to tolerate k faulty neurons.

An alternative design allocates exactly k recurrent state neurons whose output is one for any given DFA state. This is achieved by providing k*n recurrent state neurons in a single network resulting in a nearly orthonormal internal representation of DFA states. All k neurons corresponding to a DFA state are connected via their weights $W_{ijk}$ to the k neurons corresponding to a successor state.

The invention will be better understood when the following description is read in conjunction with the accompanying drawing.

BRIEF DESCRIPTION OF THE DRAWING

FIG. 3 is an algorithm for encoding arbitrary DFAs in RNNs with second-order weights;

FIG. 4 is an "n choose k"encoding algorithm;

DETAILED DESCRIPTION OF THE INVENTION

In order for a network to tolerate stuck-at-zero faults for neurons or weights, a network's internal representation of DFA states and transitions has to be distributed over several neurons and weights. Typically, the resources of any (computational) system are replicated in order to achieve fault-tolerance. The following descriptions describes different designs for achieving fault-tolerance in recurrent networks.

Figure 1:
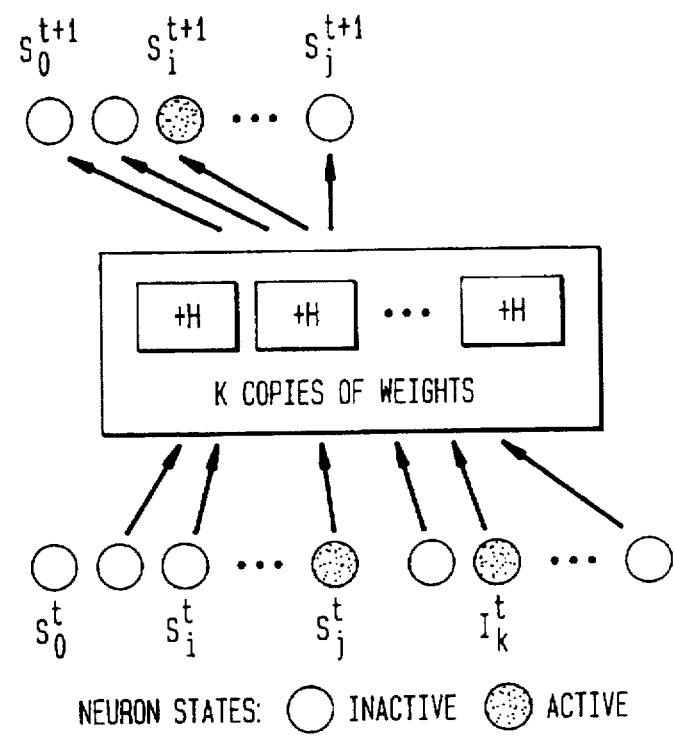
FIG. 1 is a schematic representation of a preferred design for a tolerance to faulty weights.

Referring now to the figures and to FIG. 1 in particular, there is shown a preferred design for achieving tolerance to weight-stuck-at-zero faults. A network's weights are programmed to values +H or −H. All weights +H are replicated k times. Replicating the weights programmed to +H k times allows a network to tolerate up to k−1 faulty weights per neuron. No special measures have to be taken to provide tolerance to faulty weights that are programmed to −H. The change of neuron activities during a DFA state transition $\delta(q_j, \alpha_k) = q_i$ is shown in FIG. 1. This design has the following property: a recurrent network constructed from a DFA M such that L(RNN)=L(M) will tolerate exactly k−1 stuck-at-zero faults for weights per neuron if all the weights programmed to +H are replicated k times.

The prod of this property asserts stability of the internal DFA state representation for weight strength +H. Providing k copies of all weights +H equals to constructing a network with weight strength +kH. Thus, the network will still implement a given DFA with k−1 faulty weights per neuron. It is worth noting that no replication of weights programmed to −H is necessary because low signals are preserved even when those weights are faulty.

Figure 2:
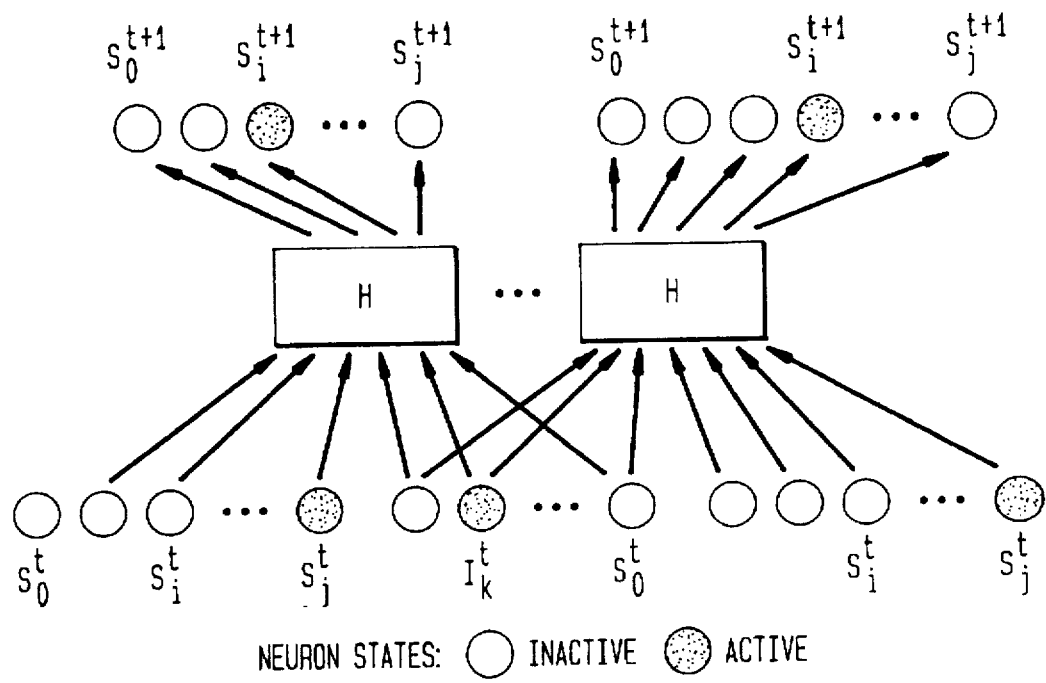
FIG. 2 is a schematic representation of an alternative design for a fault-tolerant network.

An alternative design of fault-tolerant networks is to replicate the entire network 2k+1 times, thus, k independent networks decide whether or not to accept a string. This design is shown in FIG. 2 where the entire network is replicated 2k+1 times, allowing k faulty neurons. Whether or not a string is accepted is decided based on a majority vote among the 2k+1 networks, of which at least k+1 have to be flawless. The level of fault-tolerance of such a system is expressed as: a system of 2k+1 independent recurrent networks constructed from a DFA M such that L(RNN)=L(M) will tolerate exactly k stuck-at-zero faults in neurons.

A single neuron stuck-at-zero fault in any network can cause a wrong output at the special response neuron; thus, a positive string may be misclassified. Whether or not a string is accepted has to be decided based on a majority vote among the outputs of the independent network. Commercially available logic products exist which receive a plurality of inputs and determine whether there is majority of logic level "0" or "1" inputs present. In order to tolerate k wrong outputs caused by k faulty neurons (possibly in different networks), there must be at least k+1 correct outputs from networks without faults. If a positive string is misclassified by k faulty networks, then the majority vote among the flawless networks will yield a positive answer.

As described above, conservative approaches to designing fault-tolerant recurrent networks are effective. However, because all computational resources are replicated, it seems that the available computational resources are vastly underused. For instance, the use of pairwise orthogonal internal DFA state representation leads to a very sparse internal DFA state representation, i.e. many possible internal representations are not used at all. It is therefore of interest whether other binary internal representations for DFA states are possible. In the following descriptions, properties of binary DFA encodings which are not pairwise orthogonal will be considered.

Before considering alternative designs for fault-tolerance, the following observation is made which simplifies the task: tolerance to neuron-stuck-at-zero faults also implies tolerance to weight-stuck-at-zero faults.

Fault-tolerance is achieved based on redundancy of the encoding of DFA states and state transitions. If a network can tolerate faulty neurons, then the healthy neurons and associated weights must compensate for the loss, i.e. a mechanism which recovers the state information and still performs the desired state transitions must be in place. The same mechanism will also allow the execution of state transitions if some weights that implement the state transition are faulty.

The following description is only concerned with stuck-at-zero faults in neurons.

The equation which governs the dynamics of RNNs with second-order weights, for a constructed network, can be written as $$S_i^{(t+1)} = h(a_i(t)) = \frac{1}{1+e^{-a_i(t)}}, a_i(t) = -\frac{H}{2} + \sum_{j,k} \pm H S_j^{(t)} I_k^{(t)} \quad (2)$$

where the sign of H is determined by the DFA encoding algorithm. An analysis of a constructed RNN's dynamical stability becomes feasible if the DFA representation is derived from fixed points of a RNN's discriminant functions and state transitions are programmed in a uniform way. In the preferred embodiment, the function is a sigmoid. If the sigmoidal discriminant function is approximated with a hard-limiting threshold function, then equation (2) has a natural interpretation in Boolean logic where all variables can only assume binary values:

$$s_i^u = 0 \bigvee_{j,k} \bigvee w_{ijk} \wedge s_j^v \wedge i_k \quad (3)$$

where the variables in lower case correspond to the binary interpretation of their corresponding variables in a RNN. The monotonically increasing time index is replaced with the label of the DFA state represented by the binary code. For actual RNN implementation of a DFA, the weights $W_{ijk}$ will be set to +H for $\omega_{ijk}=1$ and to 0 or $-H$ for $\omega_{ijk}=0$; however, it is sufficient to program only weights $W_{ijk}$ to $-H$ where appropriate. A binary encoding of a DFA state $q_u$ is then a code $s^u=(s_0^u, s_1^u, s_2^u, \ldots, s_n^u)$ where n is the length of the encoding and $s_i^u$ is the $i^{th}$ component of the encoding for state $q^u$. $S=\{s_i\}$ will denote the encodings of all states of a DFA. The component $s_0^u$—the response component—indicates whether or not the DFA state represented by $(s_1^u, s_2^u, \ldots, s_n^u)$ is an accepting state. The code $s^1$ for a DFAs start state $q_1$ is the start code of the encoding. A state transition $\delta(q_v, \alpha_k)=q_u$ then becomes a code transition $\omega$ with $\omega(s^v, \alpha_k)=s^u$, where $\omega$ is implemented in the following way: the 'weight' $\omega_{ijk}$ has value 1 if the components $s_i^u$ and $s_j^v$ both have value 1; components $s_i^u$ and $s_j^v$ are 'connected' via $w_{ijk}$. If an input symbol $\alpha_k$ is presented, then the 'input' $i_k$ has value 1 causing $s_i^v$ to become 1; this operation is carried out simultaneously for all components $s_i^u u$. The value of $s_0^u$ is derived from the code $s^v$ via weights $\{\omega_{0jk}\}$; $s_0^u$ has value 1 if $q_u$ is an accepting string and 0 otherwise.

Thus, an encoding of DFA M is a pair (S, W) where DFA states $Q=\{q_u\}$ naturally map into codes $S=\{s^u\}$ and state transitions $\delta(q_v, \alpha_k)=q_u$ map into code transitions $\omega(s^v,\alpha_k)=s^u$.

There is a misconception that the number $n_{DFA}$ of DFA states that can be represented in (S, W) is equal to the number of different binary strings of length $n_{DFA}$. However, this is not the case, and in FIG. 3 there is disclosed an algorithm for converting a DFA into a realizable binary encoding of a DFA. It will be apparent to those skilled in the art that by modifying the equations for choosing weight strengths H, as modified the algorithm can be used for noisy weights. The modified equation is:

$$\phi \Delta (H(1-\epsilon)) < \frac{1}{2n(1+\epsilon)} \left( (1-\epsilon) + \frac{1}{H} \right)$$

with $$\phi \overset{+}{\Delta} (H(1-\epsilon)) > \frac{1}{4} \left( 3(1+\epsilon) + \frac{1}{H} \right).$$

Hereafter, the symbol $s^{v+1}$ will be used for $\omega(s^v, \alpha_k)=s^u$ if $\alpha_k$ is arbitrary; generally, the symbol $s^{v+\tau}$ will be used for the code reached after $\tau$ symbols starting with code $s^v$.

A binary encoding (S, W) 'realizes' a DFA if the encodin W of DFA state transitions guarantees that the codes $s^{v+1}$ reached on successive code transitions $$s^v \xrightarrow{a^\tau} s^{v+1} \xrightarrow{a^{\tau+1}} \ldots s^{v+l-1} \xrightarrow{a^{\tau+l}} s^{v+l}$$

always unambiguously identify the current DFA state $q_v$.

The encodings $s^v$ for DFA states cannot be arbitrary: let m be the number of input symbols of a DFA M and $\delta(q_v, \{\alpha_k\})=\{q_{u_1}, q_{u_2}, \ldots, q_{u_m}\}$ with $q_{u_i} \neq q_{u_j}$, i.e. no two state transitions from a state $q_v$ lead to the same state $q_u$. In order for a binary encoding (S, W) to realize a DFA M, there must be at least m codes $s^{u_1}, s^{u_2}, \ldots, s^{u_m}$ which are orthogonal to the encoding $s^v$ of the current DFA state $q_v$.

That is, no two codes $s^u$ and $s^v$ can have any components in common if there exists a transition $\delta(q_v, \alpha_k)=q_u$: $s_i^u \neq s_i^v$. Assume that there are l DFA states which form a cycle ('l-cycle')

$$q_v \xrightarrow{a^\tau} q_{v+1} \xrightarrow{a^{\tau+1}} q_{v+2} \xrightarrow{a^{\tau+3}} \ldots q_{v+l-1} \xrightarrow{a^{\tau+l}} q_v$$

and that codes $s^{v+\tau}$ and $s^{v+\tau+1}$ have exactly one component $s_c^{v+\tau}=s_c^{v+\tau+1}=1$ in common and that the index c be different for different pairs of codes $s^{v+\tau}$ and $s^{v+\tau+1}$. Then, components $s_i^{v+\tau}$ and $s_i^{v+\tau+1}$ are connected via weight $\omega_{ijk}=1$. After a l-cycle, the encodings $s^v$ that were activated during the cycle have become indistinguishable, because the common component $s_c^{v+\tau}$ is propagated through every code transition starting with $\tau=0$. Thus, the number of components i with $s^{v+\tau}=1$ monotonically increases until the codes $s^{v+\tau}$ have the same components in common. In the worst case, the encoding of all states becomes indistinguishable if a DFA with n states has a cycle of length n or if the codes $s^{v+\tau}$ changed all components $s^{v+\tau}$ in $(s_0^{v+\tau}, s_1^{v+\tau}, \ldots, s_n^{v+\tau})$ during code transitions in the l-cycle.

Notice that the above argument depends on the symbols $\alpha^{\tau+l}$ being identical for all code transitions; if they are all identical, then the same weight $\omega_{ijk}$ will cause component $s_i^{v+\tau+1}$ to become 1 and never change its value for the remainder of the l-cycle.

Thus, the above establishes orthogonality of the encoding of states $q_u$ and $q^v$ in DFA state transitions $\delta(q_v, \alpha_k)=q_u$ as a necessary condition for a realizable binary encoding of a DFA. It will now be shown that other conditions are necessary as well.

If the encoding $s^u$ and $s^v$ for a DFA state transition $\delta(q_v, \alpha_k)=q^u$ are orthogonal, then the current DFA state can always be unambiguously identified from the current encoding $s^u$. Consider a code transition $\omega(s^v\alpha_k)=s^u$. If the code $s^u$ is orthogonal to code $s^v$, then encodings $s^u$ and $s^v$ never have any components $s_i^u$ in common, i.e. component $s_j^v$ always changes its value from 1 to 0 on a code transition $\omega(s^v, \alpha_k)=s^u$. Thus, the current DFA state can always be identified unambiguously from the current encoding $s^u$. An exception are code transitions $\omega(s^v, \alpha_k)=s^v$; in that case, the encoding does not change.

Thus, the two statements above provide necessary conditions for a realizable binary encoding of a DFA.

Binary codes of length logn are needed to distinguish n codes. However, codes of length logn can generally not be for realizable DFA encodings, i.e., there does not exist a minimal binary encoding ($S_{min}$, $W_{min}$) with codes ($s_0^u$, $s_1^u$, $s_2^u$, ..., $s_{log(n)}^u$) which can emulate any given DFA M with n states.

The original DFA encoding algorithm constructed DFA state transitions as transitions between unary binary DFA state codes. These codes were mutually orthonormal and thus satisfied the necessary conditions for legal binary codes.

There exist DFAs which require an orthonormal internal representation of DFA states. The graph G(M) underlying a DFA M is a graph whose vertices are the states of M and whose directed edges are the state transitions of M. If there exist multiple DFA state transition $\delta(q_v, \{\alpha_{k_1}, \alpha_{k_2}, \ldots, \alpha_{k_p}\}) = q_u$, then G(M) has a single directed edge connecting vertices u and v.

Any DFA with n states and at least n−1 input symbols whose underlying graph G(M) is completely connected requires orthonormal codes of length n+1 (including the component for the special response neuron). This rule provides a direct solution for a fault-tolerant RNN implementation of a DFA M whose underlying graph G(M) is completely connected.

Consider a RNN implementation of a DFA M whose underlying graph G(M) is completely connected. Then, the constructed network will tolerate k−1 stuck-at-zero faults in neurons (and therefore in weights) only if the codes $s^u$ have k components $s_i^u = 1$ and the codes of the DFA states M are mutually orthogonal.

Since the intersection of the sets of components with $s_i^u = 1$ and $s_j^v = 1$ for DFA states $q_u$ and $q_v$ is empty for u≠v, the current state can be uniquely identified even when k−1 neurons are faulty. It is clear that the constructed network accepts the same language L(M) with and without faults.

The required implementation is different to the straightforward implementation of a RNN discussed above where the entire network had to be replicated 2k+1 times in order to tolerate k−1 faults in neurons. Those were k independent networks (except for the output of the entire system, which requires a majority vote among the special response neurons of each network). In the present case, there are not k independent networks; it is a single network with kn neurons, but whose interconnection network is denser than that of 2K+1 independent networks.

A "n choose k" encoding algorithm is based on the premise that the representation of a current DFA state be distributed across at least k active state neurons if the constructed network is to tolerate k−1 faulty neurons. A preferred "n choose k" encoding algorithm is shown in FIG. 4.

A (binary) (k,m,n)-encoding (S, W) is a realizable encoding (S, W) of a DFA M with m input symbols where each code $s^u$ for $q_u$ has exactly k components $s_i^u = 1$ (i>0).

Given a DFA M with $n_{DFA}$ states and m input symbols, a (k,m,n)-encoding (S, W) is constructed by choosing the length $n_{RNN}$ (or simply n) of codes $s^u$ such that $$n_{DFA} \geq \binom{n}{k}$$

where exactly k components $s_i^u$ have value 1 for each code $s^u$. Consider a code transition $\omega(s^v, \alpha_k) = s^{u_k}$; where a DFA encoding is realizable only if there exist codes $s^{u_1}, s^{u_2}, \ldots, s^{u_m}$ that are orthogonal to $s^v$. By construction, none of the codes $s^{u_k}$ have any components in common with $s^v$. Since exactly k components of $s^v$ are 1, there are only n−k components left of which exactly k components for each of the m codes $s^{u_k}$ must have value 1. Thus, it is required that $$m \leq \binom{n-k}{k}$$

which leads to the condition n≥2k where equality only holds for DFAs with two states and one input symbol. Clearly, the choice for codes $s^u$ satisfy the necessary conditions of a realizable (S, W) for any DFA M. The weights $w_{ijk}$ are to be programmed to implement transitions $\omega(s^v, \alpha_k) = s^u$ such that (S, W) emulates M.

There are some interesting properties of "n choose k" codes for DPA states. For example, the capacity $C_{S,W}(k, m, n)$ of an encoding (S, W) is the maximum number of codes in (S, W) for given k, m, and n.

An upper bound on the size $n_{DFA}$ of a DFA M that can be constructed may be expressed as:

A (k, m, n)-encoding (S, W) with codes $s^u = (s_1^u, s_2^u, \ldots, s_n^u)$ has capacity $$C_{S,W}(k,m,n) = \binom{n}{\lfloor \frac{n}{2} \rfloor}.$$

This follows from the design of the codes $s^u$ and the identity $$\binom{n}{n-k} = \binom{n}{k}.$$

An encoding (S, W) for a DFA M may have higher capacity than M has states, i.e. $C_{S,W}(k,m,n) \geq n_{DFA}$. A DFA M may not exhaust the capacity of its encoding (S, W). When an encoding is constructed for a specific DFA with $n_{DFA}$ states, it is always possible find values $n_{RNN}$ and k such that $$C_{S,W}(k, m, n_{RNN}) < n_{DFA} \leq C_{S,W}(k, m, n_{RNN}+1).$$

i.e. it is possible to construct an encoding (S, W) whose capacity is not fully exhausted by the DFA M the encoding was derived from.

In programming weights $\omega_{ijk}$ for a "n choose k" encoding, consider the binary approximation of network state changes is:

$$s_i^\mu = 0 \vee \bigvee_{j,k} w_{ijk} \wedge s_j^\nu \wedge i_k. \tag{4}$$

Figure 5:
FIG. 5 is a schematic representation of a chain deterministic finite-state automaton (DFA)
Figure 6:
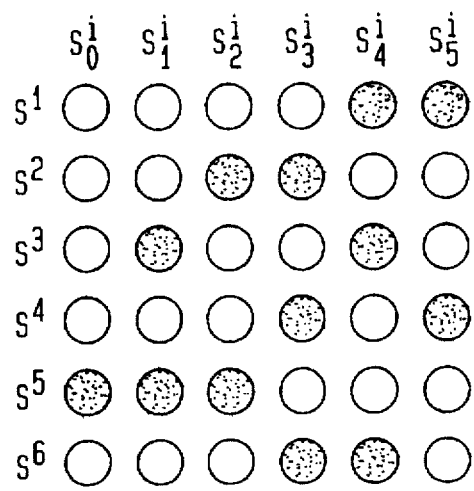
FIG. 6 is a graphical representation of a possible state encoding for the DFA shown in FIG. 3.

Referring to the simple chain DFA shown in FIG. 5 with 6 states whose alphabet consists of a single symbol, the DFA cannot be implemented in a "5 choose 2" algorithm such that no weight conflicts occur. A possible binary state encoding for the DFA states is shown in FIG. 6. Each row corresponds to the encoding of a DFA state where clear circles represent inactive neuron states and the filled circles represent active neuron states. Notice that the code of each DFA state has exactly two active neuron states (not including the response neuron $s_0$). Starting with the code $s^1=(s_0^1, s_1^1, s_2^1, s_3^1, s_4^1, s_5^1)=(0, 0, 0, 0, 1, 1)$ of the initial state, the weights $\omega_{ijk}$ must be programmed such that the codes $s^2$, $s^3$, $s^4$, $s^5$, and $s^6$ are reached on subsequent input symbols. Assume the weights have been programmed for transitions from $s^1$ to $s^2$, and from $s^2$ to $s^3$. For the transition from $s^3$ to $s^4$, the weights $\omega_{311}$, $\omega_{511}$, $\omega_{341}$, and $\omega_{541}$ must be set to 1. Comparing those weights with the weights programmed for the transition from $s^1$ to $s^2$, the weight $\omega_{541}$ was set to 0 for that transition since, otherwise, the convention that each code have exactly 2 active components would be violated. Similarly, weight $\omega_{431}$ is set to 1 for the transition from $s^2$ to $s^3$, whereas the transition from $s^4$ to $s^5$ requires $\omega_{31}$ to be set to 0. Similar conflicts will occur for the weights $\omega_{411}$, $\omega_{511}$, $\omega_{121}$, $\omega_{321}$, $\omega_{231}$, $\omega_{431}$, $\omega_{241}$, $\omega_{351}$ and $\omega_{451}$ for the chosen "5 choose 2"encoding. In general, the following holds true: weight conflicts will always occur in a "n choose k"encoding of a DFA M if M contains a chain of length l $$q_j \xrightarrow{a_k} q_{j+1} \xrightarrow{a_k} q_{j+2} \ldots \xrightarrow{a_k} q_{j+l}$$

such that $$l > \left\lfloor \frac{n}{k} \right\rfloor + 1.$$

There are two possible ways to resolve weight conflicts without increasing the network size: it is possible to either decide to set $\omega_{ijk}=0$ or to set $\omega_{ijk}=1$ when a conflict occurs for weight $W_{ijk}$. However, the codes for some DFA states will become indistinguishable as a result of either strategy to resolve weight conflicts.

Given an arbitrary DFA M with $n_{DFA}$ states, there does not exist a "n choose k" encoding of M with n<k $n_{DFA}+1$ state neurons. That is, suppose there exists a "n choose k"encoding of a DFA M with $n_{DFA}$ states with n<k $n_{DFA}+1$. Then, there are at least two states $q_u$ and $q_v$ whose codes $s^u$ and $s^v$ are not orthogonal, i.e. there exist a component $s_j^u=s_j^v=1$. Consider two different codes $s^{u+1}$ and $s^{v+1}$ which each have exactly k components with value 1 not including the response component such that $\omega(s^u, a_k)=s^{u+1}$ and $\omega(s^v, a_k)=s^{v+1}$. The components $s_{i_1}^{u+1}, s_{i_2}^{u+1}, \ldots, s_{i_k}^{u+1}$ are programmed via some weights including the weights $\omega_{i_1jk}$, $\omega hd i_{2jk}, \ldots, \omega_{i_kjk}$. But these weights will also cause the components $s_{i_1}^{v+1}, s_{i_2}^{v+1}, \ldots, s_{i_k}^{v+1}$ to have value 1. Unless $s^{u+1}$ and $s^{v+1}$ are identical codes, this contradicts the assumption about the "n choose k"encoding because these weights will force $s^{v+1}$ to have more than k components with value 1. Similarly, $s^{u+1}$ will end up with more than k components equal to 1. Thus, there do not exist weights which execute the desired code transitions for "n choose k"encodings with n<k$n_{DFA}$.

Figure 7:
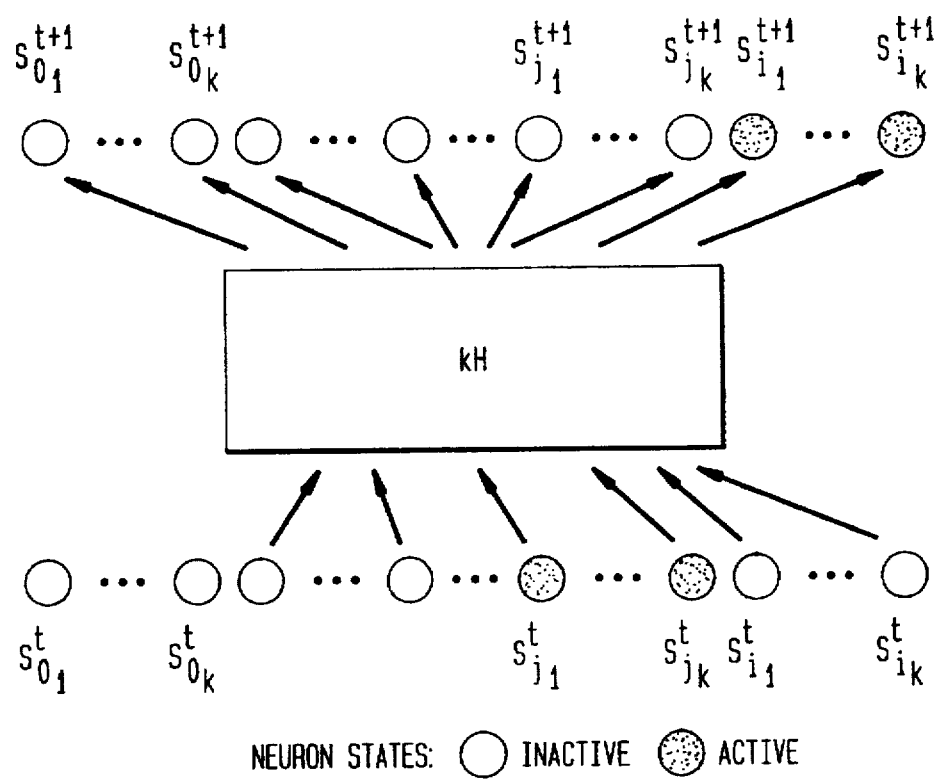
FIG. 7 is a schematic representation of "n choose k"design for tolerance to faulty neurons.

A schematic representation of a "n choose k"design for tolerance to faulty neurons (with input neurons omitted for clarity) is shown in FIG. 7. The design is similar to the design shown in FIG. 2. However, in the design in FIG. 2, the k networks worked independently, whereas in the design in FIG. 7 there is a denser interconnection network. Each DFA state is allocated k state neurons with $S_{ik}=1$ such that the binary state encodings are pairwise orthogonal.

A "n choose k"encoding for a DFA M with $n_{DFA}$ states which tolerates k-1 faulty neurons exists only for n>k $n_{DFA}+1$.

In summary, various approaches for tolerance to stuck-a-zero faults for weights and neurons provide different levels of fault-tolerance. Since any fault-tolerant design has to be based on a distribution of the resources used for the internal DFA state representation and transition, implementations based on binary encodings for DFAs were described and demonstrated under what conditions a binary encoding can realize any DFA. It is impossible to provide tolerance to stuck-at-zero faults for neurons without replicating the entire network. The attempt to reduce the network size while providing fault-tolerance was based on a "n choose k"encoding algorithm where k out of n recurrent state neurons were used to represent DFA states. A summary of the network designs and their level of fault-tolerance is shown in Table 1.

| design | # neurons | # weights | # faulty neurons | # faulty weights |
|---|---|---|---|---|
| D1 | n + 1 | O(mn) | 0 | 0 |
| D2 | n + 1 | O(kmn) | 0 | k − 1 |
| D3 | (2k + 1)(n + 1) | O(kmn) | k | k |
| D4 | k(n + 1) | O(k²mn) | k − 1 ≦ k' ≦ (k − 1)(n + 1)² | (k² − 1) ≦ k' ≦ (k² − 1)(n + 1)² |

The table shows the number of faulty neurons and/or weights various designs can tolerate. The designs are (D1) the original DFA encoding algorithm, (D2) a network with replicated weights, (D3) replicated networks and (D4) pairwise orthogonal "n choose k"encoding. The design D2 can tolerate k−1 faulty weights per neuron; with the total number of faulty weights is O(kmn). The design D4 can tolerate at least k−1 faulty neurons and (k²−1) faulty weights. If no more than k−1 neurons which uniquely identify the current DFA state are faulty, i.e. one of the k identifying neurons has a high output for all DFA states, then the network can tolerate a total of (k−1)(n+1) faulty neurons. A similar explanation applies to faulty weights.

While there has been described and illustrated fault-tolerant implementations of finite-state automata in recurrent neural networks with second-order weights, it will be apparent to those skilled in the art that variations and modifications are possible without deviating from the broad teachings and spirit of the present invention which shall be limited solely by the scope of the claims appended hereto.

What is claimed is:

1. A method of achieving a fault-tolerant deterministic finite-state automata in a recurrent neural network with second-order weights comprising the steps of:

providing inputs to a recurrent neural network, each input being associated with a second-order weight;

programming the weights of the network to assume the values +H or −H, where H is defined by $$\Phi_A^-(H(1-\epsilon)) < \frac{1}{2n(1+\epsilon)} \left( (1-\epsilon) + \frac{1}{H} \right) \text{ with}$$

$$\Phi_A^+(H(1-\epsilon)) > \frac{1}{4} \left( 3(1+\epsilon) + \frac{1}{H} \right);$$

where $\Phi_A^-(H)$ and $\Phi_A^+(H)$ are the fixed points of the discriminant function $h_A(\chi, H)$;

replicating all weights programmed to +H k times for values of k>0, thereby allowing the network to tolerate k−1 faulty weights per neuron; and generating outputs of the network based upon the inputs and the weights associated with each input.

2. A method of achieving a fault-tolerant deterministic finite-state automata in a recurrent neural network with second-order weights comprising the steps of:

providing a recurrent neural network;

providing inputs to the network, each input being associated with a second-order weight;

programming the weights of the network to assume the values +H or −H, where H is defined by $$\Phi_A^-(H(1-\epsilon)) < \frac{1}{2n(1+\epsilon)} \left( (1-\epsilon) + \frac{1}{H} \right) \text{ with}$$

$$\Phi_A^+(H(1-\epsilon)) > \frac{1}{4} \left( 3(1+\epsilon) + \frac{1}{H} \right);$$

where $\Phi_A^-(H)$ and $\Phi_A^+(H)$ are the fixed points of the discriminant function $h_A(\chi, H)$;

replicating the recurrent neural network 2k+1 times for values of k>0, thereby allowing the network to tolerate k faulty neurons; and generating outputs of the network based upon the inputs, the weights associated with each input, and the outputs of each of the 2k+1 replicated networks.

3. A method as set forth in claim 2, further comprising forming a majority vote among the outputs of each of the 2k+1 networks to decide whether a string is accepted.

4. A method of achieving a fault-tolerant deterministic finite-state automata in a recurrent neural network with second-order weights comprising the steps of:

providing k independent recurrent neural networks for values of k>0 each having n neurons where k−1 is the number of faults tolerable by the network;

providing inputs to the k networks associated with the n neurons;

assigning second-order weights for each neuron by an n choose k encoding algorithm;

programming the weights of the network to assume the values +H or −H, where H is defined by $$\Phi_A^-(H(1-\epsilon)) < \frac{1}{2n(1+\epsilon)} \left( (1-\epsilon) + \frac{1}{H} \right) \text{ with}$$

$$\Phi_A^+(H(1-\epsilon)) > \frac{1}{4} \left( 3(1+\epsilon) + \frac{1}{H} \right);$$

where $\Phi_A^-(H)$ and $\Phi_A^+(H)$ are the fixed points of the discriminant function $_A(\chi, H)$; and generating outputs of the network based upon the inputs and weights assigned to each neuron.

5. A fault-tolerant deterministic finite-state automata in a recurrent neural network with second-order weights comprising:

a recurrent neural network having second-order weights programmed to assume the values +H or −H where H, is defined by $$\Phi_A^-(H(1-\epsilon)) < \frac{1}{2n(1+\epsilon)} \left( (1-\epsilon) + \frac{1}{H} \right) \text{ with}$$

$$\Phi_A^+(H(1-\epsilon)) > \frac{1}{4} \left( 3(1+\epsilon) + \frac{1}{H} \right);$$

where $\Phi_A^-(H)$ and $\Phi_A^+(H)$ are the fixed points of the discriminant function $h_A(\chi, H)$, where k copies of the weights +H are replicated in the network to tolerate k−1 faulty weights per neuron for values of k>0;

providing inputs to the network, each input being associated with a weight; and generating outputs of the network based upon the inputs and the weights associated with each input.

6. A fault-tolerant deterministic finite-state automata in a recurrent neural network with second-order weights comprising:

2k+1 substantially identical recurrent neural networks, each network having second-order weights associated with respective inputs of each network such that outputs of each network are responsive to the weights and the inputs of each respective network;

programming the weights of the network to assume the values +H or −H, where H is defined by $$\Phi_A^-(H(1-\epsilon)) < \frac{1}{2n(1+\epsilon)} \left( (1-\epsilon) + \frac{1}{H} \right) \text{ with}$$

$$\Phi_A^+(H(1-\epsilon)) > \frac{1}{4} \left( 3(1+\epsilon) + \frac{1}{H} \right);$$

where $\Phi_A^-(H)$ and $\Phi_A^+(H)$ are the fixed points of the discriminant function $h_A(\chi, H)$; and means for forming an output of the 2k+1 networks by determining a majority vote among said outputs of the 2k+1 networks to tolerant k faulty neurons for values of k>0.

7. A fault-tolerant deterministic finite-state automata as set forth in a recurrent neural network with second-order weights comprising:

k recurrent neural networks each having n neurons each neuron being associated with an input of a network for values of k>0;

each neuron having a second-order weight assigned according to a "n choose k" encoding algorithm;

programming the weights of the network to assume the values +H or −H, where H is defined by $$\Phi_A^-(H(1-\epsilon)) < \frac{1}{2n(1+\epsilon)} \left( (1-\epsilon) + \frac{1}{H} \right) \text{ with}$$

$$\Phi_A^+(H(1-\epsilon)) > \frac{1}{4} \left( 3(1+\epsilon) + \frac{1}{H} \right);$$

where $\Phi_A^-(H)$ and $\Phi_A^+(H)$ are the fixed points of the discriminant function $h_A(\chi, H)$ ; and each output being dependent upon the inputs and the weights of the k independent networks.

\* \* \* \* \*